United States Patent
Modi et al.

(10) Patent No.: US 10,012,766 B2
(45) Date of Patent: Jul. 3, 2018

(54) MONITORING EXTERNAL VIBRATION SOURCES FOR DATA COLLECTION

(71) Applicant: Google Inc., Mountain View, CA (US)

(72) Inventors: Yash Modi, San Mateo, CA (US); Kenneth Louis Herman, San Jose, CA (US); Laura Rabb, San Jose, CA (US); Michael Lammers, Redwood City, CA (US); Bryan James, Menlo Park, CA (US); Kevin Charles Peterson, San Francisco, CA (US); Mark Rajan Malhotra, San Mateo, CA (US)

(73) Assignee: Google LLC, Mountain View, CA (US)

( * ) Notice: Subject to any disclaimer, the term of this patent is extended or adjusted under 35 U.S.C. 154(b) by 502 days.

(21) Appl. No.: 14/683,769

(22) Filed: Apr. 10, 2015

(65) Prior Publication Data

US 2016/0299256 A1    Oct. 13, 2016

(51) Int. Cl.
| | |
|---|---|
| *G01B 3/00* | (2006.01) |
| *G01B 5/00* | (2006.01) |
| *G01W 1/10* | (2006.01) |
| *G01V 1/30* | (2006.01) |

(52) U.S. Cl.
CPC .............. *G01W 1/10* (2013.01); *G01V 1/30* (2013.01)

(58) Field of Classification Search
CPC .......... G02B 2027/014; G02B 27/0172; G02B 2027/0138; G02B 27/0093; G02B 27/0179; G02B 2027/0185; G02B 21/0028; G02B 21/0032; G02B 21/0076; G02B 27/0176; G02B 2027/0178; G02B 27/017; G02B 2027/0141
See application file for complete search history.

(56) References Cited

U.S. PATENT DOCUMENTS

| | | | |
|---|---|---|---|
| 6,130,412 A | 10/2000 | Sizemore | |
| 6,356,204 B1 | 3/2002 | Guindi et al. | |
| 7,168,324 B2 | 1/2007 | Boda et al. | |
| 7,353,088 B2 | 4/2008 | Eagen et al. | |
| 7,424,403 B2 | 9/2008 | Robinson et al. | |
| 7,729,807 B2 | 6/2010 | Guillemot et al. | |
| 7,840,992 B1* | 11/2010 | Dufrene ............. | G06F 11/1461 726/1 |
| 8,706,458 B2 | 4/2014 | Gupta et al. | |
| 2003/0065409 A1* | 4/2003 | Raeth ................. | G05B 9/02 700/31 |
| 2006/0089753 A1 | 4/2006 | Eagen et al. | |
| 2007/0033153 A1* | 2/2007 | Yamanaka ........... | G01V 1/008 706/21 |

(Continued)

*Primary Examiner* — Roy Y Yi
(74) *Attorney, Agent, or Firm* — Morris & Kamlay LLP (57) ABSTRACT

A system and method is provided for the control of a network of devices wherein each device of the networked devices provides for the operation of a sensor such as an accelerometer, processor and communication element within each device, and network and/or cloud based processing and storage, to process collected data to permit detection and predictive analysis of traffic patterns, weather patterns and other forces of nature. The system and method can analyze duration and magnitude of vibration signals, and considering maps and known locations of devices, tracks and highways and historical data regarding each, use machine learning techniques to accurately classify the motion and provide real-time and predictive analysis.

25 Claims, 2 Drawing Sheets

(56) References Cited

U.S. PATENT DOCUMENTS

| | | |
|---|---|---|
| 2008/0082296 A1 | 4/2008 | Robinson et al. |
| 2008/0150717 A1 | 6/2008 | Guillemot et al. |
| 2012/0078520 A1* | 3/2012 | Kachi .................... G01V 1/008 |
| | | 702/15 |
| 2012/0319866 A1 | 12/2012 | Svoen et al. |
| 2013/0016211 A1 | 1/2013 | Yeh |
| 2013/0021473 A1 | 1/2013 | Yeh |

* cited by examiner

MONITORING EXTERNAL VIBRATION SOURCES FOR DATA COLLECTION

BACKGROUND

As data collection, processing and communication tools become more available, their use in practical applications becomes more desirable. As one example, data collection, processing and communication regarding environmental conditions can have significant beneficial applications. There are a number of environmental conditions that can be of concern and subject of detection at both localized and regional levels. For example, a need always exists for more accurate, real-time data collection which permits detection of traffic patterns, including automotive patterns, train patterns and other vehicular patterns on roads, bridges, tunnels and so forth. Further, a need always exists for more accurate, real-time data collection which permits detection of weather patterns, including hurricane patterns, tornado patterns and other forces of nature such as earthquakes. Still further, data collection which permits the predictive analysis of such patterns and occurrences is of even greater value. For example, the predictive analysis of a storm path based upon the data collections can be used to provide better advanced warning to people in a storm or flood path.

Such data collection and analysis would typically require a broad distribution of collection points to perform quickly and accurately. However, implementing and maintaining such a distribution of collection points solely for the purpose of data collection regarding traffic patterns, weather patterns and other forces of nature would become cost prohibitive. Further, the distribution of such devices would require implementation and maintenance of communication elements between the devices to exchange data quickly and accurately, which further becomes cost prohibitive.

BRIEF SUMMARY

According to implementations of the disclosed subject matter, a system and method is provided for the effective and efficient use of networked control and sensing devices distributed throughout a region for accurate, real-time data collection which permits detection and predictive analysis of traffic patterns, weather patterns and other forces of nature.

To do so, an implementation of the disclosed subject matter provides for the operation of a sensor within a device, the device being one of a plurality of spatially and geographically distributed devices, to collect, analyze and communicate environmental data at the sensor location in real time.

An implementation of the disclosed subject matter also provides for the operation of an accelerometer sensor within the device to collect, analyze and communicate vibration data at the sensor location in real time.

An implementation of the disclosed subject matter also provides for the operation of a processor within the device to analyze and classify the collected vibration data.

An implementation of the disclosed subject matter also provides for the operation of a communication element within the device to exchange the analyzed and classified vibration data with network and/or cloud based processing and storage.

An implementation of the disclosed subject matter also provides for the networking of devices both locally, such as within a house or business, and regionally, such as within a postal code area, wherein each device of the networked devices provides for the operation of a sensor such as an accelerometer within each device, provides for the operation of a processor within each device, and provides for the operation of a communication element within each device.

An implementation of the disclosed subject matter also provides for the operation of a network and/or cloud based processing and storage system to process collected data to permit detection and predictive analysis of traffic patterns, weather patterns and other forces of nature.

According to an implementation of the disclosed subject matter, means is provided for networking devices wherein each device of the networked devices provides for the operation of a sensor such as an accelerometer, processor and communication element within each device, and network and/or cloud based processing and storage to process collected data to permit detection and predictive analysis of traffic patterns, weather patterns and other forces of nature.

According to further implementations of the disclosed subject matter, a system and method is provided for the control of networked devices distributed throughout a region for data collection which permits detection and predictive analysis of traffic patterns, weather patterns and other forces of nature. The system and method is provided for the control of a network of devices wherein each device of the networked devices provides for the operation of a sensor such as an accelerometer, processor and communication element within each device, and network and/or cloud based processing and storage to process collected data to permit detection and predictive analysis of traffic patterns, weather patterns and other forces of nature.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of the disclosed subject matter. No attempt is made to show structural details in more detail than may be necessary for a fundamental understanding of the disclosed subject matter and various ways in which it may be practiced.

DETAILED DESCRIPTION

Implementations of the disclosed subject matter enable the capture and analysis of environmental data by using sensors such as accelerometers that are already found in existing, distributed systems, for example, those found in premises management devices in homes and businesses. By collecting, processing and analyzing aggregate data from sensors, and knowing other aspects such as geographic location of the devices containing the sensors therein, implementations of the disclosed subject matter capture and analyze data that can be used to identify and classify sources of the data to improve map services, navigation services, traffic services, and so forth, and provide predictive analysis results including alerts and warnings regarding the sources of the data. Each device of the networked devices provides for the operation of a sensor such as an accelerometer, processor and communication element within each device, and network and/or cloud based processing and storage, to process collected data to permit detection and predictive analysis of traffic patterns, weather patterns and other forces of nature.

Implementations disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor, vibration sensor and/or acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry.

A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

A sensor as disclosed herein may also include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor, sensor device or simply device. For clarity, sensors are described with respect to the particular functions they perform and/or the particular physical hardware used, when such specification is necessary for understanding.

Figure 1:
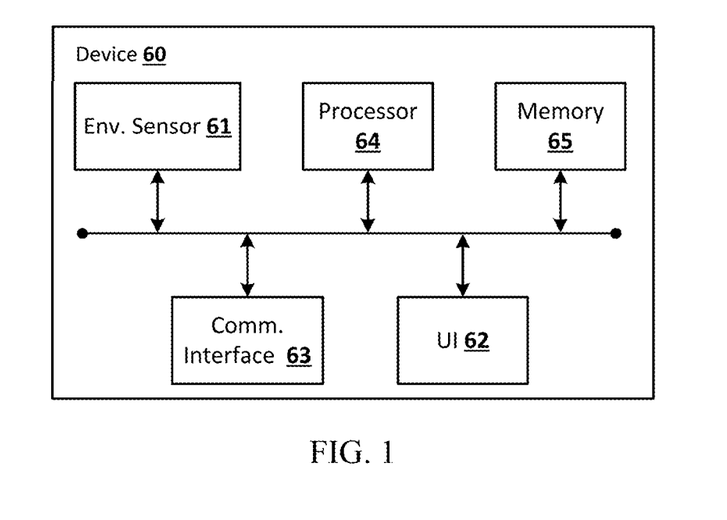
FIG. 1 shows an illustrative device for incorporating an accelerometer sensor according to an implementation of the disclosed subject matter.

A premises management device may include hardware and software in addition to the specific physical sensor that obtains information about the environment. FIG. 1 shows an illustrative premises management device as disclosed herein. The premises management device 60 may include an environmental sensor 61, such as an accelerometer sensor or any other suitable environmental sensor that obtains a corresponding type of information about the environment where the premises management device 60 is located. A processor 64 may receive and analyze data obtained by the sensor 61, control operation of other components of the premises management device 60, and process communication with other devices. The processor 64 may execute instructions stored on a computer-readable memory 65. The memory 65 or another memory in the premises management device 60 may also store environmental data obtained by the sensor 61. A communication interface 63, such as a Wi-Fi or other wireless interface, Ethernet or other local network interface, or the like may allow for communication by the premises management device 60 with other devices.

A user interface (UI) 62 may provide information and/or receive input from a user of the sensor. The UI 62 may include, for example, a speaker to output an audible alarm when an event is detected by the premises management device 60. Alternatively, or in addition, the UI 62 may include a light to be activated when an event is detected by the premises management device 60. The user interface may be relatively minimal, such as a limited-output display, or it may be a full-featured interface such as a touchscreen. Components within the premises management device 60 may transmit and receive information to and from one another via an internal bus or other mechanism as will be readily understood by one of skill in the art. One or more components may be implemented in a single physical arrangement, such as where multiple components are implemented on a single integrated circuit. Devices as disclosed herein may include other components, and/or may not include all of the illustrative components shown.

As a specific example, the premises management device 60 may include as an environmental sensor 61, an accelerometer sensor that obtains a corresponding type of information about the environment where the premises management device 60 is located. An illustrative accelerometer sensor 61 includes improved features with respect to detection, distinction and communication of data regarding vibrations or simply movements within an environment of the premises management device 60.

An accelerometer generally behaves as a damped mass on a spring. When the accelerometer experiences an acceleration, the mass is displaced to the point that the spring is able to accelerate the mass at the same rate as the housing of the device. The displacement is then measured to give the acceleration. In commercial devices, piezoelectric, piezo resistive and capacitive components are commonly used to convert mechanical motion into an electrical signal. Piezoelectric accelerometers rely on piezo ceramics or single crystals, and are preferred for applications requiring operations in upper frequency and temperature ranges and having low package weight. Piezo resistive accelerometers are preferred in high shock applications. Capacitive accelerometers typically use silicon micro-machined sensing elements, and are preferred for applications requiring operations in low frequency ranges and having high stability and linearity. Implementations of the disclosed subject matter can include accelerometers incorporating any of these or other technologies.

The illustrative accelerometer sensor 61 is configured to detect vibrations, movements, and other similar signals within an environment surrounding the premises management device 60. Examples of such vibrations include, but are not limited to, vibrations generated when a user interacts with or touches the device (e.g., changes batteries, pushes buttons on the device and so forth), when a user interacts with the environment of the device (e.g., doors in the environment are opened or closed, items dropped to a floor and so forth), when vehicles (e.g., cars, trucks, buses, trains, planes, ships and so forth) pass through the environment, when weather events (e.g., hurricanes, tornados, hail, thunderstorms, lightning and so forth) pass through the environment, or when earth movements (e.g., earthquakes, landslides, avalanches and so forth) occur in the environment. Currently, some of this information is provided by road sensors and traffics sensors setup by departments of transportation to track traffic patterns. The implementation of the disclosed subject matter can eliminate the need for the installation and use of such external dedicated sensors, since the sensors 61 are already found in existing, distributed systems, for example, those found in premises management devices in homes and businesses.

Figure 2:
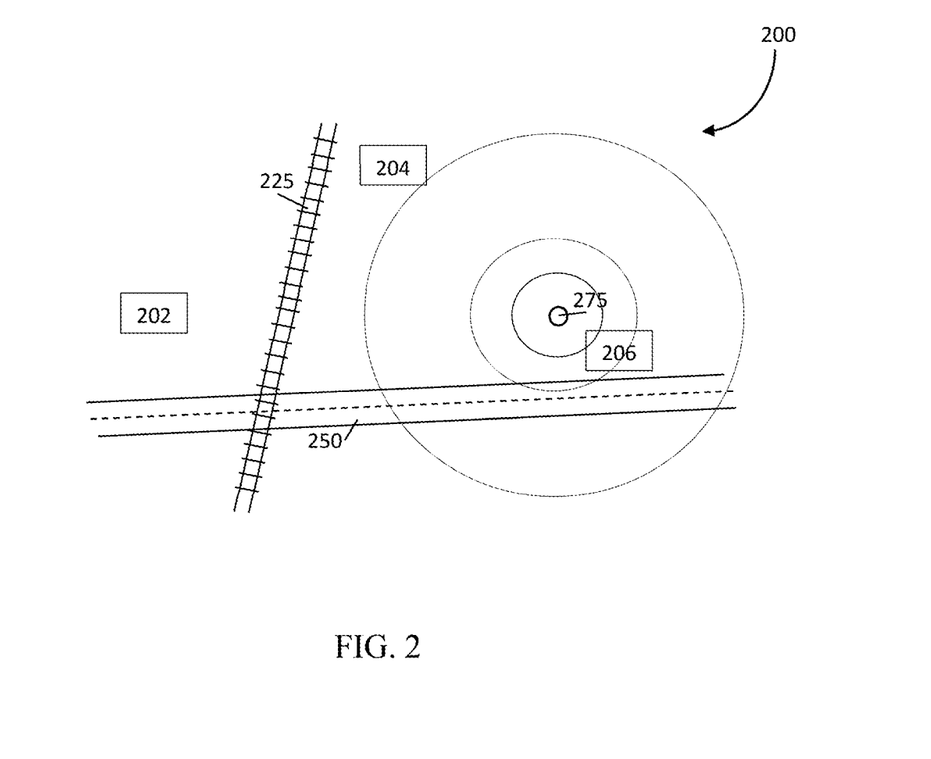
FIG. 2 shows an illustrative device environment for data detection according to an implementation of the disclosed subject matter.

The network of premises management devices 60 are spatially located in homes and businesses, and geographically dispersed across regions such as neighborhoods, cities, counties, states, postal zip or public switched telephone network (PSTN) codes, and can be configured to detect, analyze and communicate environmental conditions such as vibrations at each location in real time. FIG. 2 shows an illustrative device environment 200 for data detection. As shown in FIG. 2, devices 202, 204 and 206 are spatially located in homes and businesses, and geographically dispersed across regions such as neighborhoods, cities, counties, states, postal zip or PSTN codes. A rail track 225 is shown, passing between devices 202 and 204 and more specifically, passing closest to device 204 and passing farthest from device 206. A highway 250 is shown, passing by devices 202 and 206 and more specifically, passing closest to devices 202 and 206, and passing farthest from device 204. An illustrative earthquake occurrence is shown at 275 with concentric rings denoting attenuating vibrations, wherein device 206 is the closest device to the center of the earthquake occurrence 275 and device 202 is the farthest device from the center of the earthquake occurrence 275.

The rail track 225 and highway 250, and historical transportation patterns thereon, are known and mapped relative to device locations, and data sensed by the devices 202, 204, 206 is classified by type based upon magnitude and duration at the device, and based on magnitude and duration detected at other devices. The sensed data is processed at each device, and at a cloud based level or combination thereof, which allows comparisons between devices to aid in more detailed classification of the data and for providing predictions based thereon.

Each device can monitor the data to classify the motion type or source, wherein there can be a number of classes of motion. Some classes of motion can be local in nature, and consist of such things as a user moving around the environment (house or business) or pressing buttons on the device itself, or cars entering or exiting a garage of the house or business. Other classes of motion can be regional in nature, such as vehicles (e.g., cars, trucks, buses, trains, planes, ships and so forth) passing through the environment, weather events (e.g., hurricanes, tornados, hail, thunderstorms, lightning and so forth) passing through the environment, or earthmovements (e.g., earthquakes, landslides, avalanches and so forth) occurring in the environment. As illustrated by FIG. 2, each motion can be detected by multiple devices 202, 204, 206. Movement of the source of the motion, such as along the rail track 225, can also be detected by multiple devices 202, 204, 206 by analyzing duration and magnitude, correlating duration and magnitude values detected at other devices, and considering maps and known locations of devices, tracks and highways and historical data regarding each. Finally, implementations of the disclosed subject matter use machine learning techniques to accurately classify the motion as, for example, a user action with the device, a passing train or truck, a passing storm or earthquake. Such real time detection and predictive analysis can then be used by other systems, such as the department of transportation for direction or route planning, or weather alert systems.

As illustrated in FIG. 2, a network of devices 202, 204, 206 permit implementations of the disclosed subject matter to easily distinguish a local motion from a regional motion. For example, the devices 202, 204, 206 can be used to determine if a motion started at the same time with a similar signature pattern throughout a region, thereby indicating a possible earthquake. If a rail track 225 track is known and using devices 202, 204, 206 at different distances from one another and from the track 225, and sensing data of different magnitudes, a passing train can be identified. Where device 204 is closer to the track 225 and device 206 is farther from the track 225, the data amplitude will be different but a signature will be the same and can be used to identify that a train is passing and in what direction and speed. Similar measurements can be used to detect other passing vehicles and even passing storms such as hail storms or tornados.

Implementations of the disclosed subject matter allow detection and classification of conditions at a single device level, neighborhood level, or regional level, and allows condition tracking over time, levels and delays. For example, a center of an earthquake, hurricane, hail storm or tornado can be identified, and predictive analysis can be used to predict paths including direction and speed, where applicable. By moving from device to device and comparing data at each subsequent device with data of the previous devices, implementations of the disclosed subject matter can accurately predict the next device which will experience the motion, an expected time of occurrence, and expected magnitude and duration. In doing so, implementations of the disclosed subject matter can easily and accurately provide severe weather warnings, without reliance on current radar and other warning systems.

As noted above, each premises management device 60 can include the processor 64 to receive and analyze data obtained by the sensor 61, control operation of other components of the premises management device 60, and process communication with other devices. The processor 64 may execute instructions stored on the computer-readable memory 65, and the communication interface 63 allows for communication with other devices and uploading data to network or cloud based levels which allows comparisons between devices, historical data, to aid in more detailed classification of the data and for providing predictions based thereon.

In an illustrative implementation, at least some raw data is not uploaded to network or cloud based levels. Each individual device can be used to exclude some measurements, and analyze other measurements to identify metrics such as frequency components, standard deviation of the signal(s), maximum amplitudes and so forth, which are then uploaded to network or cloud based levels. Preferably, where classifications indicate a local or in-house event such as a user interacting with or touching the device (e.g., changing batteries, pushing buttons on the device and so forth) or a user interacting with the environment of the device (e.g., user moving about the environment, doors in the environment opened or closed, items dropped to a floor, cars entering or exiting a garage and so forth), processing of data can be local. Each device can analyze duration and magnitude, and considering maps and known locations tracks and highways and historical data regarding each, use machine learning techniques to accurately classify the motion. As known to those skilled in the art, machine learning is an implementation of algorithms that can learn from data without user input. Such algorithms operate by building a model from example inputs and using that to make predictions or decisions, rather than following strictly static program instructions.

Where classification indicates a regional or wide-range event such as vehicles (e.g., cars, trucks, buses, trains, planes, ships and so forth) passing through the environment, weather events (e.g., hurricanes, tornados, hail, thunderstorms, lightning and so forth) passing through the environment, or earthmovements (e.g., earthquakes, landslides, avalanches and so forth) occurring in the environment, data processing can occur at network or cloud based levels. The network or cloud based levels can correlate duration and magnitude values detected at devices, and considering maps and known locations of devices, tracks and highways and historical data regarding each, use machine learning techniques to accurately classify the motion and provide predictive analysis based thereon. Such real time detection and predictive analysis can then be used by other systems, such as the department of transportation for direction or route planning, or weather alert systems.

Further, by using a network of sensors and devices, sensor redundancy is provided. In existing systems that apply a number of dedicated sensors at points to collect such data, a single dedicated sensor can fail and reduce the accuracy and operation of the entire system. However, by using sensors that are already found in existing, distributed systems and collecting data in aggregate, implementations of the disclosed subject matter prevent the problems associated with such dedicated-sensor based networks and allows the system to exclude malfunctioning sensors from the network of collected data. A number of techniques can be used to identify malfunctioning sensors such as detection of unexpected excessive or minimal measurement values, erratic or otherwise unusable measurement values and/or measurement values which fail to correlate with one or more other measurement values.

Figure 3:
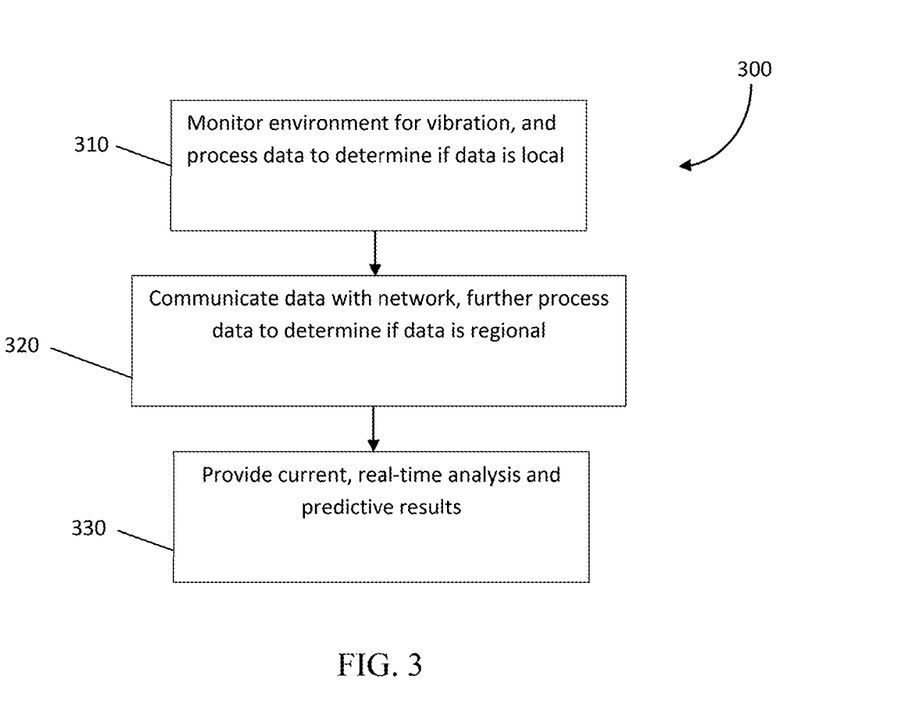
FIG. 3 is a flow chart of an illustrative process of detection and predictive analysis of traffic patterns, weather patterns and other forces of nature according to an implementation of the disclosed subject matter.

FIG. 3 is a flow chart of an illustrative process 300 of detection and predictive analysis of traffic patterns, weather patterns and other forces of nature. In a first step 310, one or more of a plurality of premises management devices monitor an environment of each for vibration or motion, and process the data sufficiently to determine if the data is local. Each premises management device can analyze duration and magnitude, and considering maps and known locations tracks and highways and historical data regarding each, use machine learning techniques to accurately classify the motion.

In a second step 320, the premises management devices communicate data with network or cloud based levels which further process the data sufficiently to determine if the data is regional. The premises management devices communicate data with network or cloud based levels upon detection of the data, periodically or when queried. The premises management devices can store measured environmental data until queried by the processor, and the processor can query the premises management devices to request communication of the measured environmental data. The processor can be coupled to memory, such as RAM, ROM, flash memory, a hard disk or any other device capable of storing electronic information.

The network or cloud based levels can correlate duration and magnitude values detected at devices, and considering maps and known locations of devices, tracks and highways and historical data regarding each, use machine learning techniques to accurately locate and classify the motion. For example, each premises management device can be configured to measure environmental data at the same time. By using known locations of each participating device and detected differences in data magnitude measured by each, implementations of the disclosed subject matter can calculate a location of one or more of the sources of the data, including single sources of data, multiple sources of data, and a particular source identified within a group of sources of data. The process can be repeated and new results compared with previous results to calculate a profile and motion of the source, including direction and speed. These analysis results can be applied to known map and geographical features, such as highways, rail tracks and river channels to further identify the source as vehicle, train or ship, and provide predictive analysis of the source direction and speed. For example, where a source is identified as a vehicle and an identified location corresponds to a highway, a predictive analysis can provide vehicle direction and speed projected along the highway. By moving from device to device and comparing data at each subsequent device with data of the previous devices, implementations of the disclosed subject matter can track the vehicle and detect changes in direction and speed, and predict the next device which will experience the motion, an expected time of occurrence, and expected magnitude and duration.

A similar evaluation can be used to identify the source as a weather event such as a tornado, and provide predictive analysis of the source magnitude, direction and speed. For example, where a source is identified as a tornado, a predictive analysis can provide tornado direction and speed projected along a path. By moving from device to device and comparing data at each subsequent device with data of the previous devices, implementations of the disclosed subject matter can track the tornado and detect changes in direction and speed, and predict the next device which will experience the motion, an expected time of occurrence, and expected magnitude and duration. Therefore implementations of the disclosed subject matter can provide severe weather warnings, without reliance on current radar and other warning systems. Further, by applying machine learning techniques such as algorithms that can learn from data without user input, implementations of the disclosed subject matter can calculate and store accurate profiles and predictive analysis data to more quickly and accurately provide future analysis results based upon same or similar data inputs.

In a third step 330, the network or cloud based levels provide current, real-time analysis results and predictive analysis results based on the detected data, excluding data of malfunctioning premises management devices. The process can then be repeated. Further, alerts can be provided to any number of the premises management devices or other devices or systems based on the predictive analysis results.

In some implementations, the premises management devices use encryption processes to ensure privacy, anonymity and security of data. Data stored in the device's memory as well as data transmitted to other devices can be encrypted or otherwise secured. Additionally, the user can set the device profile to limit the amount and kind of information that is measured, stored and shared with other devices. The user can also be provided with an opt-in mechanism by which they can voluntarily set the amount and type of information that is measured, stored and communicated (e.g., exclude local data), and may be compensated or rewarded for sharing a greater amount of information. Users may also opt-out of such a system at any time. Users who are the source of data offered by data sellers and desired by data buyers may also be compensated or rewarded based on revenue that is derived from the data.

Devices as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general—or special-purpose. For example, one type of central controller is a home automation network that collects and analyzes data from one or more sensors within the home. For example, the central controller can analyze duration and magnitude of vibration signals, and considering maps and known locations of devices, tracks and highways and historical data regarding each, use machine learning techniques to accurately classify the motion.

Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network.

Alternatively or in addition, a central controller as disclosed herein may be remote from the sensors, such as where the central controller is implemented as a cloud-based system that communicates with multiple sensors, which may be located at multiple locations and may be local or remote with respect to one another. For example, a central controller can correlate duration and magnitude values of vibration signals detected at devices, and considering maps and known locations of devices, tracks and highways and historical data regarding each, use machine learning techniques to accurately classify the motion and provide predictive analysis based thereon.

Figure 4:
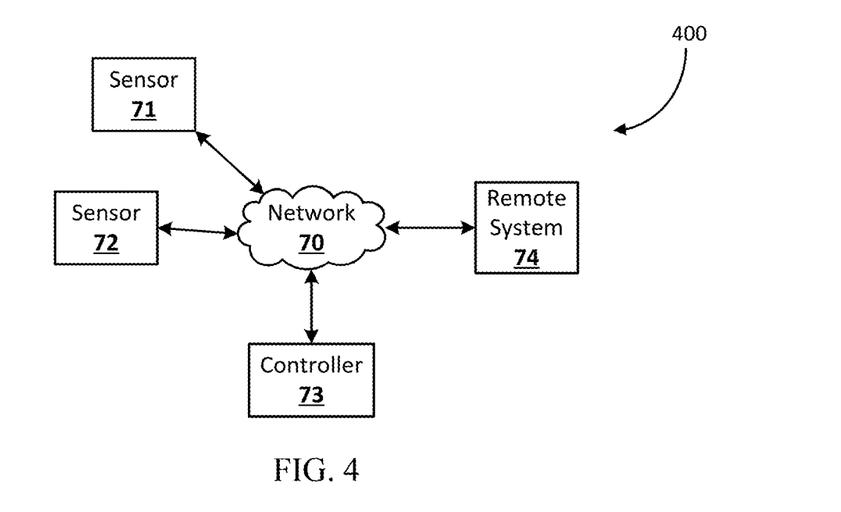
FIG. 4 shows an illustrative device network as disclosed herein, which may be implemented over any suitable wired and/or wireless communication network.

FIG. 4 shows an illustrative sensor network 400 as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general—or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 4 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure), at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 4 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 4.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

Various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing implementations of the disclosed subject matter. When implemented on a general-purpose microprocessor, the computer program code may configure the microprocessor to become a special-purpose device, such as by creation of specific logic circuits as specified by the instructions.

Implementations can utilize hardware that may include a processor, such as a general purpose microprocessor and/or an Application Specific Integrated Circuit (ASIC) that embodies all or part of the techniques according to the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to the disclosed subject matter.

The foregoing description, for purpose of explanation, has been described with reference to specific implementations. However, the illustrative discussions above are not intended to be exhaustive or to limit the disclosed subject matter to the precise forms disclosed. Many modifications and variations are possible in view of the above teachings. The implementations were chosen and described in order to explain the principles of the disclosed subject matter and practical applications, to thereby enable others skilled in the art to utilize those implementations as well as other implementations with various modifications as may be suited to the particular use contemplated.

The invention claimed is:

1. An environmental data monitoring and reporting system, comprising:
a plurality of premises management devices, each including one or more environmental sensors that detect environmental conditions and create environmental data based on the detected environmental conditions where the device is located, the environmental data indicating non-human movement detected by at least one of the plurality of environmental sensors; and
a processor to analyze environmental data received from the plurality of premises management devices, identify a single source of the movement and provide predictive analysis results regarding the source of the movement for at least one of the group consisting of: map services, navigation services, and traffic services provided by the processor.

2. The system of claim 1, wherein:
a plurality of environmental sensors at different locations are configured to detect environmental conditions at substantially the same time and create environmental data based on the detected environmental conditions; and
the processor is configured to identify the single source of the movement and provide predictive analysis results regarding the source of the movement by analyzing the environmental data that was created by the plurality of environmental sensors at different locations.

3. The system of claim 1, wherein the environmental sensors comprise accelerometers, and wherein the detected environmental conditions comprises vibration detected by the accelerometers.

4. The system of claim 1, wherein each premises management device can identify local sources of movement occurring within an environment of the premises management device, wherein the environment of each premises management device comprises a home or building.

5. The system of claim 4, wherein local sources of movement comprise a user movement in the environment, a vehicle movement originating from or terminating within the environment or a user interacting with the premises management device.

6. The system of claim 1, wherein the processor can identify regional sources of movement occurring within an environment of the plurality of premises management devices, wherein the environment of the plurality of premises management devices comprises a neighborhood, city, county, state, postal zip code area or public switched telephone network (PSTN) code area.

7. The system of claim 6, wherein regional sources of movement comprise a vehicle passing through the environment, a weather event passing through the environment or an earth movement occurring in the environment.

8. The system of claim 7, wherein the processor is configured to provide predictive analysis results based on the regional sources of movement, comprising an expected path of the vehicle passing through the environment, an expected path of the weather event passing through the environment, or an expected path of the earth movement occurring in the environment.

9. The system of claim 1, wherein the processor is configured to provide alerts based on the predictive analysis results.

10. The system of claim 1, wherein the processor is configured to identify a malfunctioning environmental sensor and exclude environmental data of the malfunctioning environmental sensor.

11. The system of claim 1, wherein the premises management devices are configured to store the environmental data until queried by the processor, and the processor is configured to query the premises management devices to request communication of the environmental data.

12. An environmental data monitoring and reporting system, comprising:

a processor configured to communicate with a plurality of premises management devices, each including one or more environmental sensors that detect environmental conditions and create environmental data based on the detected environmental conditions where the device is located, the environmental data indicating non-human movement detected by at least one of the plurality of environmental sensors, and analyze environmental data received from the plurality of premises management devices, identify a single source of the movement and provide predictive analysis results regarding the source of the movement for at least one of the group consisting of: map services, navigation services, and traffic services provided by the processor.

13. The system of claim 12, wherein the processor is configured to identify the single source of the movement and provide predictive analysis results regarding the source of the movement by analyzing the environmental data that was created by the plurality of environmental sensors at different locations.

14. The system of claim 12, wherein the processor is configured to identify regional sources of movement occurring within an environment of the plurality of premises management devices, wherein the environment of the plurality of premises management devices comprises a neighborhood, city, county, state, postal zip code area or public switched telephone network (PSTN) code area.

15. The system of claim 14, wherein regional sources of movement comprise a vehicle passing through the environment, a weather event passing through the environment or an earth movement occurring in the environment.

16. The system of claim 15, wherein the processor is configured to provide predictive analysis results based on the regional sources of movement, comprising an expected path of the vehicle passing through the environment, an expected path of the weather event passing through the environment, or an expected path of the earth movement occurring in the environment.

17. The system of claim 12, wherein the processor is configured to provide alerts based on the predictive analysis results.

18. The system of claim 12, wherein the processor is configured to identify a malfunctioning environmental sensor and exclude environmental data of the malfunctioning environmental sensor.

19. A method for environmental data monitoring and reporting, comprising:

controlling a processor to communicate with a plurality of premises management devices, each including one or more environmental sensors that detect environmental conditions and create environmental data based on the detected environmental conditions where the device is located, the environmental data indicating non-human movement detected by at least one of the plurality of environmental sensors, and controlling the processor to analyze environmental data received from the plurality of premises management devices, identify a single source of the movement and provide predictive analysis results regarding the source of the movement for at least one of the group consisting of: map services, navigation services, and traffic services provided by the processor.

20. The method of claim 19, further comprising controlling the processor to identify the single source of the movement and provide predictive analysis results regarding the source of the movement by analyzing the environmental data that was created by the plurality of environmental sensors at different locations.

21. The method of claim 19, further comprising controlling the processor to identify regional sources of movement occurring within an environment of the plurality of premises management devices, wherein the environment of the plurality of premises management devices comprises a neighborhood, city, county, state, postal zip code area or public switched telephone network (PSTN) code area.

22. The method of claim 21, wherein regional sources of movement comprise a vehicle passing through the environment, a weather event passing through the environment or an earthmovement occurring in the environment.

23. The method of claim 22, further comprising controlling the processor to provide predictive analysis results based on the regional sources of movement, comprising an expected path of the vehicle passing through the environment, an expected path of the weather event passing through the environment, or an expected path of the earthmovement occurring in the environment.

24. The method of claim 19, further comprising controlling the processor to provide alerts based on the predictive analysis results.

25. The method of claim 19, further comprising controlling the processor to identify a malfunctioning environmental sensor and exclude environmental data of the malfunctioning environmental sensor.

* * * * *